(12) United States Patent
Moon et al.

(10) Patent No.: US 8,879,480 B2
(45) Date of Patent: Nov. 4, 2014

(54) METHOD AND BASE STATION FOR ALLOCATING DOWNLINK HARQ CHANNEL IN WIRELESS COMMUNICATION SYSTEM

(75) Inventors: Pil-Jae Moon, Seoul (KR);
Byung-Chan Ahn, Seoul (KR)

(73) Assignee: Samsung Electronics Co., Ltd. (KR)

( * ) Notice: Subject to any disclaimer, the term of this patent is extended or adjusted under 35 U.S.C. 154(b) by 955 days.

(21) Appl. No.: 13/013,396

(22) Filed: Jan. 25, 2011

(65) Prior Publication Data
US 2011/0182258 A1 Jul. 28, 2011

(30) Foreign Application Priority Data
Jan. 25, 2010 (KR) .................. 10-2010-0006446

(51) Int. Cl.
| | | |
|---|---|---|
| *H04W 4/00* | (2009.01) | |
| *H04L 1/18* | (2006.01) | |
| *H04W 72/04* | (2009.01) | |
| *H04W 28/04* | (2009.01) | |
| *H04W 28/06* | (2009.01) | |

(52) U.S. Cl.
CPC ........... *H04L 1/1893* (2013.01); *H04W 72/044* (2013.01); *H04W 28/04* (2013.01); *H04W 28/06* (2013.01); *H04L 1/1812* (2013.01)

USPC ........................................................ 370/329

(58) Field of Classification Search
CPC .............................. H04W 72/04; H04W 28/04
USPC ........................................................ 370/329
See application file for complete search history.

(56) References Cited

U.S. PATENT DOCUMENTS

| | | | |
|---|---|---|---|
| 2012/0008639 A1* | 1/2012 | Chen ............................. | 370/437 |
| 2013/0155993 A1* | 6/2013 | Kim et al. ...................... | 370/329 |

* cited by examiner

*Primary Examiner* — Shripal Khajuria
(74) *Attorney, Agent, or Firm* — The Farrell Law Firm, P.C.

(57) ABSTRACT

A method and base station are provided for allocating a Hybrid Automatic Repeat Request (HARQ) channel according to service flow types. The method allocates a DownLink (DL) HARQ channel by a base station to a mobile station which can be provided with data corresponding to at least one Service Flow (SF) in a wireless communication system. At least one of a plurality of HARQ channels is mapped to a first SF. It is determined whether to allocate the mapped at least one HARQ channel as a dedicated HARQ channel of the first SF based on whether traffic of the first SF exists in a transmission queue corresponding to the first SF. Therefore, dedicated HARQ channels for a delay intolerant SF, such as a Voice over Internet Protocol (VoIP) SF, can be managed without loss of a maximum throughput for a delay tolerant SF such as a Best Effort (BE) SF.

20 Claims, 4 Drawing Sheets

METHOD AND BASE STATION FOR ALLOCATING DOWNLINK HARQ CHANNEL IN WIRELESS COMMUNICATION SYSTEM

PRIORITY

This application claims priority under 35 U.S.C. §119(a) to a Korean Patent Application filed in the Korean Intellectual Property Office on Jan. 25, 2010 and assigned Serial No. 10-2010-0006446, the entire disclosure of which is incorporated herein by reference.

BACKGROUND OF THE INVENTION

1. Field of the Invention

The present invention relates generally to a method and base station for allocating a DownLink (DL) Hybrid Automatic Repeat Request (HARQ) channel in a wireless communication system, and more particularly, to a method and base station for allocating a DL HARQ channel according to service flow types.

2. Description of the Related Art

A HARQ operation of a DL in a wireless communication system is provided in detail below.

The HARQ technique in a wireless communication system is used to reduce influences of a channel and interference fluctuation. By using the HARQ technique, a Signal to Noise Ratio (SNR) can be increased and a time diversity effect can be obtained, thereby enhancing communication performance.

When a base station transmits a HARQ burst to a mobile station, it also transmits a HARQ Channel Identifier (ACID) indicating a HARQ channel through which the HARQ burst is transmitted and a HARQ identifier Sequence Number (AI_SN) indicating whether current transmission of the HARQ burst is an initial transmission or a retransmission to the mobile station, together with the HARQ burst.

If there is no error in the HARQ burst that is received by the mobile station, the mobile station transmits an ACKnowledgement (ACK) to the base station. Upon receiving the ACK for the corresponding ACID from the mobile station, the base station transmits an initial HARQ burst containing new data to the mobile station through the HARQ channel indicated by the ACID.

If an error occurs in the received HARQ burst, the mobile station transmits a Non-ACKnowledgement (NACK) to the base station. Upon receiving the NACK for the corresponding ACID, the base station retransmits the HARQ burst to the mobile station through the HARQ channel indicated by the ACID. Upon receiving the retransmitted HARQ burst, the mobile station combines the HARQ burst transmitted previously through the HARQ channel indicated by the ACID with the retransmitted HARQ burst and decodes the combination.

FIG. 1 is a diagram illustrating a wireless communication system in which a mobile station is provided with one or more service flows from a base station.

A mobile station 102 may be provided with data of one or more Service Flows (SFs) from a base station 100. Thus, the data of several SFs related to the mobile station 102 may be contained in one HARQ burst. For example, a HARQ burst transmitted from the base station 100 to the mobile station 102 may contain data of a delay tolerant SF, such as a Best Effort (BE) service, and data of a delay intolerant SF, such as a Voice over Internet Protocol (VoIP) service.

As such, when both the data of the delay tolerant SF and the data of the delay intolerant SF are contained in the single HARQ burst, if the delay tolerant SF, which occupies a greater amount of traffic than the VoIP SF, uses all HARQ channels, the delay intolerant SF may not be allocated resources at once.

Hence, in an IEEE 802.16e system, a HARQ channel for a particular SF may be designated (or reserved) through a HARQ channel mapping Type/Length/Value (TLV) field, which is one of a plurality of Information Elements (IEs) transmitted from a base station to a mobile station. Specifically, the HARQ channel for the VoIP SF is separately designated (or reserved), such that the designated (or reserved) HARQ channel cannot be used by other SFs.

Moreover, in the IEEE 802.16e system, after a particular SF is connected between a mobile station and a base station, the base station cannot dynamically change an already allocated HARQ channel by using a HARQ channel mapping TLV field. Therefore, even if a VoIP SF is not currently connected, a HARQ channel has to be reserved in advance for the VoIP SF that may be connected later.

As a result, if a HARQ channel for a particular SF has been reserved through a HARQ channel mapping TLV field, a single user peak throughput that a single SF can obtain is lower than when a HARQ channel is not reserved. This result is due to the fact that the number of HARQ channels the single SF can use is reduced by the number of reserved HARQ channels.

SUMMARY OF THE INVENTION

The present invention has been made to address at least the above problems and/or disadvantages and to provide at least the advantages described below. Accordingly, an aspect of the present invention provides a method and base station for allocating a HARQ channel, by which even when a dedicated HARQ channel is allocated for a particular SF, the dedicated HARQ channel can be used for other SFs according to the existence or absence of transmission data of the particular SF.

Another aspect of the present invention provides a method and base station for allocating a HARQ channel, which can be freely managed without a need to provide information about a HARQ channel mapped for HARQ transmission.

According to an aspect of the present invention, a method is provided for allocating a DL HARQ channel by a base station to a mobile station, which can be provided with data corresponding to at least one SF in a wireless communication system. At least one of a plurality of HARQ channels is mapped to a first SF. It is determined whether to allocate the mapped at least one HARQ channel as a dedicated HARQ channel of the first SF based on whether traffic of the first SF exists in a transmission queue corresponding to the first SF.

According to another aspect of the present invention, a base station is provided for allocating a DL HARQ channel to a mobile station, which can be provided with data corresponding to at least one SF in a wireless communication system. The base station includes at least one transmission queue for storing data corresponding to respective SFs. The base station also includes a scheduler for mapping at least one of a plurality of HARQ channels to a first SF and determining whether to allocate the mapped at least one HARQ channel as a dedicated HARQ channel of the first SF based on whether traffic of the first SF exists in a transmission queue corresponding to the first SF.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
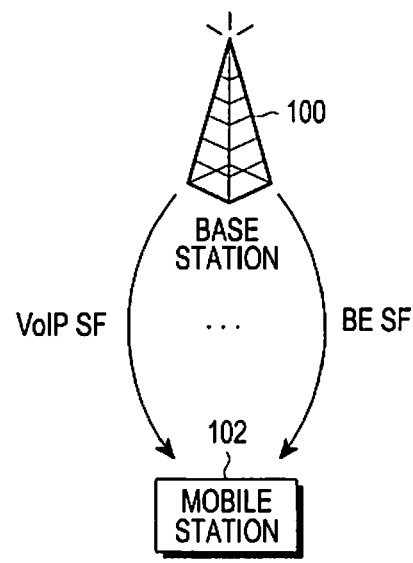
FIG. 1 is a diagram illustrating a wireless communication system in which a mobile station is provided with one or more SFs from a base station.

Embodiments of the present invention are described in detail with reference to the accompanying drawings. The same or similar components may be designated by similar reference numerals although they are illustrated in different drawings. Detailed descriptions of constructions or processes known in the art may be omitted to avoid obscuring the subject matter of the present invention.

Figure 2:
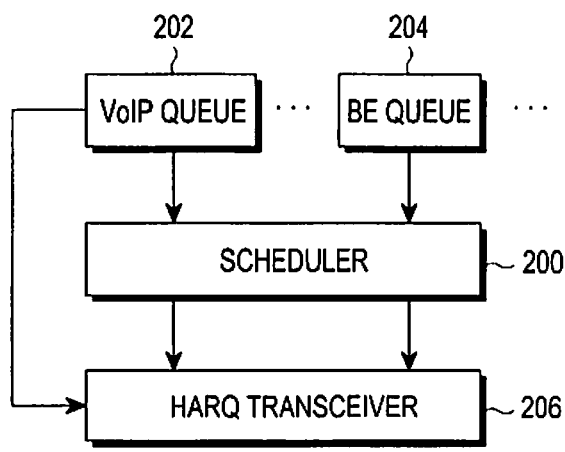
FIG. 2 is a block diagram of a base station, according to an embodiment of the present invention.

FIG. 2 is a block diagram of a base station, according to an embodiment of the present invention.

Referring to FIG. 2, the base station 100 may include one or more transmission queues 202 and 204 for storing transmission data for respective SFs, a scheduler 200 for performing scheduling for data transmission of the SFs, and a HARQ transceiver 206 for generating and transmitting HARQ bursts.

The transmission queues 202 and 204 may include, for example, a VoIP queue 202 for transmitting data of a VoIP SF and/or a BE queue 204 for transmitting data of a BE SF.

The scheduler 200 performs scheduling, such as allocation of channels for transmitting data of SFs provided from the transmission queues 202 and 204, and delivers the provided data of the SFs to the HARQ transceiver 206. Detailed functions of the scheduler 200 are described in greater detail below.

The HARQ transceiver 206 receives the data of the SFs from the scheduler 200 or the transmission queues 202 and 204, generates HARQ bursts, and transmits the generated HARQ bursts to the mobile station 102.

The scheduler 200 implicitly sets a HARQ channel mapping scheme and controls HARQ to operate according to the set scheme. Herein, "implicitly setting" means that there is no need to inform the mobile station 102 of the HARQ channel mapping scheme set by the scheduler 200.

When transmitting data of the VoIP SF and/or the BE SF, the scheduler 200 generates the HARQ bursts according to HARQ channel mapping setting. Specifically, if a HARQ channel is not one that is set for an SF according to the implicitly set HARQ channel mapping scheme, the scheduler 200 controls the HARQ channel so that it is not available for the SF.

Hence, the BE SF cannot use a HARQ channel that is set for the VoIP SF. Since HARQ bursts, even those for the same mobile station, are generated according to HARQ channel mapping, the retransmission priority of the HARQ bursts can be adjusted according to the set HARQ channel.

The mobile station does not need to know the HARQ channel mapping scheme set by the base station because the mobile station needs to merely receive DownLink (DL) bursts transmitted from the base station. Thus, the mobile station does not need to modify an existing operation scheme for HARQ burst reception. The mobile station can also receive HARQ bursts according to an existing reception scheme even when unaware of the HARQ channel mapping scheme set by the base station. Hence, when the base station applies the HARQ channel mapping scheme to the VoIP SF, it does not need to separately transmit a HARQ channel mapping TLV field to the mobile station. Therefore, the base station does not need to transmit IEs for HARQ channel setting according to SF types to the mobile station, thereby reducing overhead for HARQ transmission.

In the following description, it is assumed that the maximum number of DL ACIDs is 16 (0~15), for example, in an IEEE 802.16e system.

Initial HARQ channel mapping may be set according to SF types as set forth below in Table 1.

TABLE 1

| HARQ Channel No. | 0~13 | 14 | 15 |
|---|---|---|---|
| BE | O | O | O |
| VoIP | X | O | O |

A BE SF is used as an example of a general delay tolerant SF and a VoIP SF is used as an example of a delay intolerant SF. Whether HARQ channel mapping is set is expressed by 'O' and 'X'. 'O' means that a HARQ channel is mapped to an SF, and 'X' means that a HARQ channel is not mapped to an SF.

The BE SF is set to use all HARQ channels. In other words, the BE SF shares HARQ channels that the VoIP SF can use. The BE SF is set to use all HARQ channels because a maximum single user peak throughput can be obtained when only the BE SF is used.

An SF, such as the VoIP SF, does not generally occupy a large amount of traffic, and thus is mapped to use some of the HARQ channels, e.g., Channels #14 and #15. The number of HARQ channels mapped for the VoIP SF may vary depending on an actual service environment.

Optionally, information about a channel mapped for the VoIP SF, for example, an ACID, may be notified to the mobile station through a message transmitted from the base station to the mobile station. Optionally, information about a channel mapped for the VoIP SF may use a predetermined value.

Tables 2 and 3 show HARQ channel mapping setting which can be used by the scheduler 200 according to state transition based on existence or absence of traffic of the VoIP SF. The state transition will be described in greater detail below.

TABLE 2

| HARQ Channel No. | 0~13 | 14 | 15 |
|---|---|---|---|
| BE | O/Available | O/Unavailable | O/Unavailable |
| VoIP | X | O/Available | O/Available |

Table 2 shows HARQ channel mapping setting in case of existence of the traffic of the VoIP SF.

TABLE 3

| HARQ Channel No. | 0~13 | 14 | 15 |
|---|---|---|---|
| BE | O/Available | O/Available | O/Available |
| VoIP | X | O/Unavailable | O/Unavailable |

Table 3 shows HARQ channel mapping setting for absence of the traffic of the VoIP SF.

In Tables 2 and 3, 'O' and 'X' express whether respective HARQ channels are mapped to SFs. 'Available' and 'Unavailable' express whether HARQ channels mapped to SFs, i.e., channels expressed with 'O', are allocated to allow the corresponding SFs to actually use the mapped HARQ channels. In other words, it is shown in Tables 2 and 3 that, when traffic of the VoIP SF exists, Channels #14 and #15 are dedicated to be 'available' only for the VoIP SF. When traffic of the VoIP SF is absent, Channels #14 and #15 are dedicated to be 'available' only for the BE SF.

Figure 3:
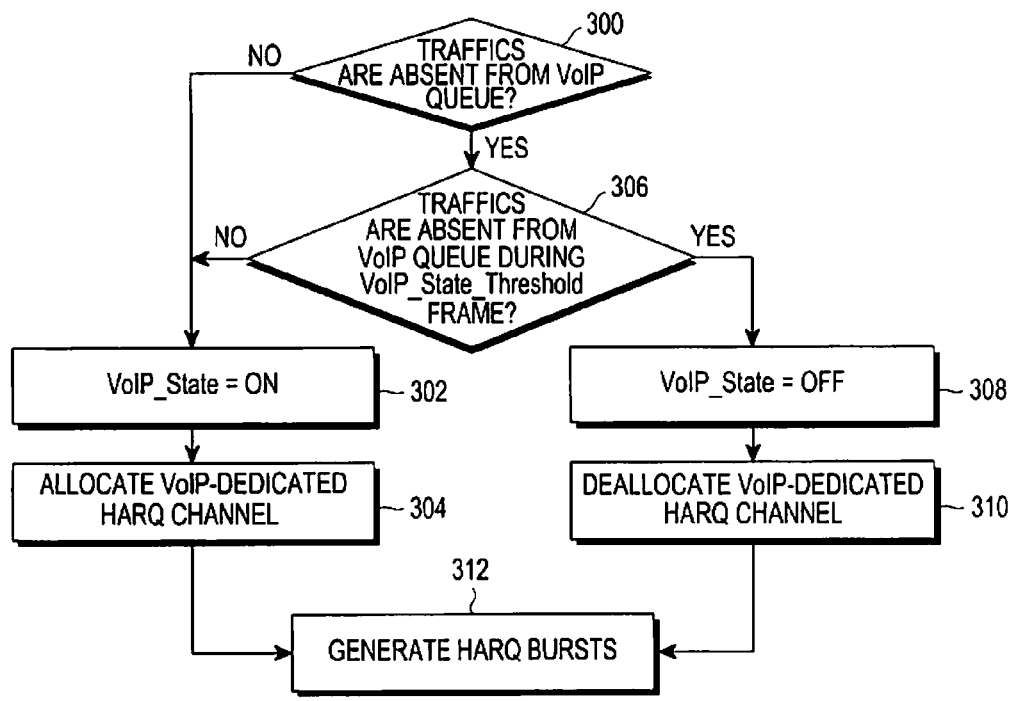
FIG. 3 is a flowchart illustrating an initial HARQ channel allocation method, according to an embodiment of the present invention.

FIG. 3 is a flowchart illustrating an initial HARQ channel allocation method, according to an embodiment of the present invention.

In step 300, the scheduler 200 determines whether traffic exists in the VoIP queue 202, which stores data to be transmitted through the VoIP SF. Specifically, the scheduler 200 may determine whether data of the VoIP SF has to be transmitted based on whether the traffic exists in the VoIP queue 202.

If the traffic exists in the VoIP queue 202, the scheduler 200 sets VoIP_State to 'ON' in step 302 and allocates at least one HARQ channel as a dedicated HARQ channel for the VoIP SF in step 304. Herein, allocation of the dedicated HARQ channel for the VoIP SF is the controlling of an HARQ channel, which is mapped to be shared between the VoIP SF and the BE SF, so that it is no longer used for the BE SF.

When traffic is absent from the VoIP queue 202, the scheduler 200 determines whether a time period during which the traffic is absent from the VoIP queue 202 is longer than a predetermined time, i.e., a threshold time, in step 306. Specifically, the scheduler 200 determines whether the traffic is absent from the VoIP queue 202 during a VoIP_State_Threshold frame.

Optionally, the mobile station may be notified of the threshold time through a message transmitted from the base station. Optionally, the threshold time may be a predetermined value that is known to both the base station and the mobile station. In this case, message exchange between the mobile station and the base station may be omitted.

As a result of the determination in step 306, if the time period corresponding to the absence of the traffic from the VoIP queue 202 is shorter than the threshold time, specifically, if the traffic exists in the VoIP queue 202 during the VoIP_State_Threshold frame, the scheduler 200 determines that the traffic of the VoIP SF remains in the VoIP queue 202, and the methodology continues at step 302.

As a result of the determination in step 306, if the time period corresponding to the absence of the traffic from the VoIP queue 202 is longer than the threshold time, specifically, if the traffic is absent from the VoIP queue 202 during the VoIP_State_Threshold frame, the scheduler 200 determines that the traffic of the VoIP SF does not exist and sets VoIP_State to 'OFF' in step 308. The scheduler 200 then deallocates the dedicated HARQ channels for the VoIP SF in step 310. Herein, deallocation of the dedicated HARQ channels for the VoIP SF is equivalent to controlling the dedicated HARQ channels for the VoIP SF to be available for other SFs when the dedicated HARQ channels are previously allocated to the VoIP SF.

In step 312, the scheduler 200 generates HARQ bursts according to channel allocation of steps 304 and 310. The generated HARQ bursts are transmitted to the mobile station through the HARQ transceiver 206.

A HARQ operation method when the traffic of the VoIP SF exists is described with reference to FIG. 4, and a HARQ operation method when the traffic of the VoIP SF is absent, that is, when transmission of the traffic of the BE SF, will be described with reference to FIG. 5.

Figure 4:
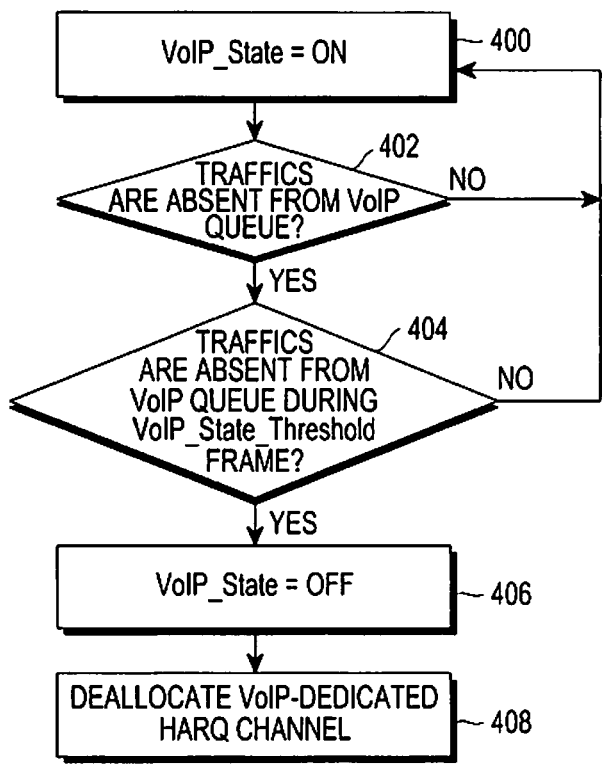
FIG. 4 is a flowchart illustrating a HARQ channel allocation method when traffic of a VoIP SF exists, according to an embodiment of the present invention.

FIG. 4 is a flowchart illustrating a HARQ channel allocation method when the traffic of the VoIP SF exists, according to an embodiment of the present invention.

If the traffic of the VoIP SF exists, the scheduler 200 uses HARQ channels the VoIP SF can use, for example, Channels #14 and #15 in Table 2, as dedicated HARQ channels for the VoIP SF. To this end, the scheduler 200 sets VoIP_State indicating states of the HARQ channels for the VoIP SF, e.g., states of Channels #14 and #15 in Table 2, to 'ON' in step 400. When the VoIP_State is 'ON', channels dedicated to the VoIP SF cannot be used for traffic of the BE SF or other real-time SFs.

Thereafter, the scheduler 200 determines whether the traffic of the VoIP SF exists in the VoIP queue 202 in step 402, such that the scheduler 200 maintains VoIP_State as 'ON' during existence of the traffic of the VoIP SF to generate HARQ bursts.

As a result of the determination in step 402, if the traffic of the VoIP SF is absent from the VoIP queue 202, the scheduler 200 determines whether a time period corresponding to the absence of the traffic from the VoIP queue 202 is longer than a threshold time. Specifically, the scheduler 200 determines whether the traffic of the VoIP SF is absent from the VoIP queue 202 during a VoIP_State_Threshold frame in step 404.

As a result of the determination in step 404, if the time period corresponding to the absence of the traffic from the VoIP queue 202 is shorter than the threshold time, specifically, if the traffic of the VoIP SF exists in the VoIP queue 202 during the VoIP_State_Threshold frame, the scheduler 200 determines that the traffic of the VoIP SF remains and maintains VoIP_State as 'ON' to generate HARQ bursts.

As a result of the determination in step 404, if the time period corresponding to the absence of the traffic from the VoIP queue 202 is larger than the threshold time, specifically, if the traffic of the VoIP SF is absent from the VoIP queue 202 during the VoIP_State_Threshold frame, the scheduler 200 determines that the traffic of the VoIP SF no longer exists and transitions the VoIP_State to 'OFF' in step 406.

When VoIP_State is transitioned to 'OFF', the scheduler 200 deallocates the dedicated HARQ channels for the VoIP SF in step 408. Thus, the HARQ channels dedicated to the VoIP SF, e.g., Channels #14 and #15 in Table 2, can be used for traffic of the BE SF.

If new data of the VoIP SF is transmitted to the VoIP queue 202 when VoIP_State is 'OFF', the VoIP_State is transitioned to 'ON'. This process will be described with reference to FIG. 5 in a HARQ channel allocation method when the traffic of the VoIP SF is absent.

Figure 5:
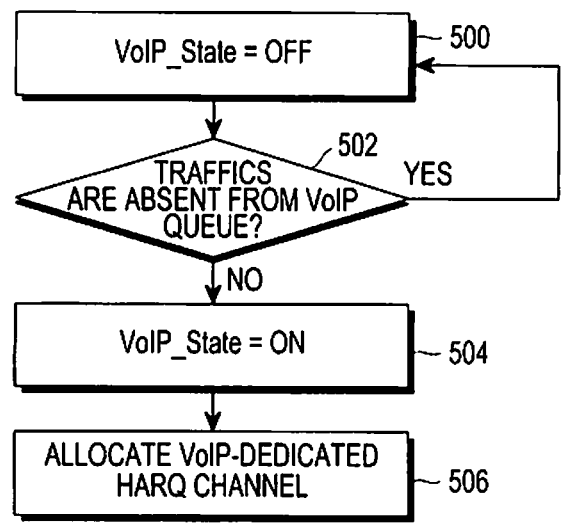
FIG. 5 is a flowchart illustrating a HARQ channel allocation method when traffic of a VoIP SF is absent, according to an embodiment of the present invention.

FIG. 5 is a flowchart illustrating a HARQ channel allocation method when traffic of the VoIP SF is absent, according to an embodiment of the present invention.

If the traffic of the VoIP SF does not exist, the scheduler 200 allows delay tolerant SFs, such as the BE SF, to use all HARQ channels. Specifically, the scheduler 200 sets the VoIP_State indicating states of HARQ channels for the VoIP SF to 'OFF' in step 500. In other words, when VoIP_State is 'OFF', channels mapped to the VoIP SF, e.g., Channels #14 and #15 in Table 3, can be used for the BE SF or other real-time SFs. In this case, when HARQ channels are allocated for the BE SF, HARQ channels which are not shared with the VoIP SF, e.g., Channels #0~#13 in Table 3, are used first if possible (regardless of VoIP_State). In this way, HARQ channels to be dedicated for the VoIP SF, e.g., Channels #14 and #15 in Table 3, remain at the time of transition of VoIP_State to 'ON', such that the HARQ channels can be allocated to the VoIP SF immediately.

Thereafter, the scheduler 200 determines whether the traffic of the VoIP SF exists in the VoIP queue 202 in step 502, such that the scheduler 200 maintains VoIP_State as 'OFF' during absence of the traffic of the VoIP SF to generate HARQ bursts.

As a result of the determination in step 502, if the traffic of the VoIP SF exists in the VoIP queue 202, the scheduler 200 transitions the VoIP_State to 'ON' for transmission of data of the VoIP SF in step 504.

When VoIP_State is transitioned to 'ON', the scheduler 200 allocates dedicated HARQ channels to the VoIP SF in step 506, such that the dedicated HARQ channels for the VoIP SF, e.g., Channels #14 and #15 in Table 3, cannot be used for the BE SF or other real-time SFs.

As described with reference to FIG. 4, if the traffic of the VoIP SF is absent from the VoIP queue 202 longer than the threshold time (VoIP_State_Threshold frame) event when VoIP_State is 'ON', VoIP_State may be transited to 'OFF'.

As such, the base station allows channels dedicated for the VoIP SF to be used for delay tolerant services, such as the BE SF, according to existence or absence of the traffic of the VoIP SF, without transmitting additional IEs to the mobile station, thereby achieving a maximum single user peak throughput and reducing message overhead for dedicated channel allocation.

It should be noted that structures or operations illustrated in FIGS. 2 through 5 are not intended to limit the scope of embodiments of the present invention. Specifically, the structure of the base station illustrated in FIG. 2 is only an example and does not mean that all of the illustrated components have to be necessarily included to implement the base station. The processes illustrated in FIGS. 3 through 5 only illustrate operations of the scheduler 200 and do not mean that all the illustrated processes have to be included to implement the HARQ allocation method or have to be separately executed by particular calculation or algorithms.

As can be appreciated from the foregoing description, dedicated HARQ channels for a delay intolerant SF, such as the VoIP SF, can be managed without loss of a maximum throughput for a delay tolerant SF such as the BE SF.

Moreover, by reducing overhead caused by transmission of a HARQ channel mapping TLV field to the mobile station, DL resources can be efficiently used.

The above-described operations can be implemented by including a memory device having corresponding program codes stored therein in an arbitrary component of the base station. Specifically, respective components of the base station may execute the above-described operations by reading and executing the program codes stored in the memory device under control of a processor or a Central Processing Unit (CPU).

While the present invention has been shown and described with reference to certain embodiments thereof, it will be understood by those skilled in the art that various changes in form and detail may be made therein without departing from the spirit and scope of the invention as defined by the appended claims.

What is claimed is:

1. A method for allocating a DownLink (DL) Hybrid Automatic Repeat Request (HARQ) channel by a base station to a mobile station which can be provided with data corresponding to at least one Service Flow (SF) in a wireless communication system, the method comprising the steps of:

mapping at least one of a plurality of HARQ channels to a first SF; and determining whether to allocate the mapped at least one HARQ channel as a dedicated HARQ channel of the first SF based on whether traffic of the first SF exists in a transmission queue corresponding to the first SF.

2. The method of claim 1, further comprising allocating the mapped at least one HARQ channel as the dedicated HARQ channel for the first SF when the traffic of the first SF exists in the transmission queue.

3. The method of claim 2, further comprising determining that the traffic of the first SF exists when a time period during which the traffic of the first SF exists in the transmission queue is longer than a predetermined time.

4. The method of claim 2, further comprising deallocating the allocated dedicated HARQ channel when the traffic of the first SF does not exist in the transmission queue after the allocation of the mapped at least one HARQ channel as the dedicated HARQ channel for the first SF.

5. The method of claim 1, further comprising allocating the plurality of HARQ channels to a second SF when the traffic of the first SF is absent from the transmission queue.

6. The method of claim 5, further comprising determining that the traffic of the first SF is absent from the transmission queue when a time period during which the traffic of the first SF is absent from the transmission queue is longer than a predetermined time.

7. The method of claim 5, further comprising allocating the mapped at least one HARQ channel as the dedicated HARQ channel for the first SF when the traffic of the first SF exists in the transmission queue after the allocation of the plurality of HARQ channels to the second SF.

8. The method of claim 1, further comprising transmitting information about the at least one HARQ channel mapped to the first SF to the mobile station.

9. The method of claim 5, wherein the first SF and the second SF are distinguished according to a degree of delay tolerance.

10. The method of claim 5, wherein the first SF comprises a Voice over Internet Protocol (VoIP) SF, and the second SF comprises a Best Effort (BE) SF.

11. A base station for allocating a DownLink (DL) Hybrid Automatic Repeat Request (HARQ) channel to a mobile station which can be provided with data corresponding to at least one Service Flow (SF) in a wireless communication system, the base station comprising:

at least one transmission queue for storing data corresponding to respective Service Flows (SFs); and a scheduler for mapping at least one of a plurality of HARQ channels to a first SF and determining whether to allocate the mapped at least one HARQ channel as a dedicated HARQ channel of the first SF based on whether traffic of the first SF exists in a transmission queue corresponding to the first SF.

12. The base station of claim 11, wherein the scheduler allocates the mapped at least one HARQ channel as the dedicated HARQ channel for the first SF when the traffic of the first SF exist in the transmission queue.

13. The base station of claim 12, wherein the scheduler determines that the traffic of the first SF exists when a time period corresponding to the existence of the traffic of the first SF in the transmission queue is longer than a predetermined time.

14. The base station of claim 12, wherein the scheduler deallocates the allocated dedicated HARQ channel when the traffic of the first SF does not exist in the transmission queue after allocating the mapped at least one HARQ channel as the dedicated HARQ channel for the first SF.

15. The base station of claim 11, wherein the scheduler allocates the plurality of HARQ channels to a second SF when the traffic of the first SF is absent from the transmission queue.

16. The base station of claim 15, wherein the scheduler determines that the traffic of the first SF is absent from the transmission queue when a time period corresponding to the absence of the traffic of the first SF from the transmission queue is longer than a predetermined time.

17. The base station of claim 15, wherein the scheduler allocates the mapped at least one HARQ channel as the dedicated HARQ channel for the first SF when the traffic of the first SF exists in the transmission queue after allocating the plurality of HARQ channels to the second SF.

18. The base station of claim 11, further comprising a HARQ transceiver for transmitting information about the at least one HARQ channel mapped to the first SF to the mobile station.

19. The base station of claim 15, wherein the first SF and the second SF are distinguished according to a degree of delay tolerance.

20. The base station of claim 15, wherein the first SF comprises a Voice over Internet Protocol (VoIP) SF, and the second SF comprises a Best Effort (BE) SF.

* * * * *